United States Patent [19]

Coleman et al.

[11] Patent Number: 5,369,141
[45] Date of Patent: Nov. 29, 1994

[54] POLYMERS OF HIGH REFRACTIVE INDEX AND HIGH HEAT DISTORTION TEMPERATURE

[75] Inventors: Charles R. Coleman, Pittsburgh; Stephanie J. Oates, Monroeville; James Colton, Trafford; Vaikunth S. Prabhu, Murrysville, all of Pa.

[73] Assignee: PPG Industries, Inc., Pittsburgh, Pa.

[21] Appl. No.: 900,036

[22] Filed: Jun. 17, 1992

Related U.S. Application Data

[63] Continuation-in-part of Ser. No. 537,308, Jun. 13, 1990, abandoned.

[51] Int. Cl.$^5$ .................. G02B 1/00; B29B 11/00
[52] U.S. Cl. ..................... 523/106; 528/109; 528/361; 528/364
[58] Field of Search ............... 523/106; 528/109, 361, 528/364

[56] References Cited

U.S. PATENT DOCUMENTS

| | | | |
|---|---|---|---|
| 2,933,473 | 4/1960 | Schmitz | 260/47 |
| 3,090,793 | 5/1963 | Casement | 260/399 |
| 4,136,086 | 1/1979 | Baumann et al. | 528/99 |
| 4,342,863 | 8/1982 | Hohokabe et al. | 528/360 |
| 4,546,155 | 10/1985 | Hirose et al. | 528/109 |

FOREIGN PATENT DOCUMENTS

| | | |
|---|---|---|
| 0374258 | 6/1990 | European Pat. Off. |
| 0509190A2 | 10/1992 | European Pat. Off. |
| 2383206 | 6/1978 | France. |
| WO89/10575 | 11/1989 | Japan. |
| 1050095 | 12/1966 | United Kingdom. |
| 1419917 | 12/1975 | United Kingdom. |
| 2200357 | 8/1988 | United Kingdom. |

OTHER PUBLICATIONS

Abstract of JP01[1989]-98615.
Abstract of JP01[1989]-215816.

*Primary Examiner*—Paul R. Michl
*Assistant Examiner*—LaVonda DeWitt
*Attorney, Agent, or Firm*—George D. Morris

[57] ABSTRACT

Ophthalmic lenses and lens blanks having high refractive index and high heat distortion temperature are produced by polymerizing a polymerizable, homogeneous composition comprising epichalcogen resin, aliphatic polythiol, and cyclic anhydride.

17 Claims, No Drawings

POLYMERS OF HIGH REFRACTIVE INDEX AND HIGH HEAT DISTORTION TEMPERATURE

This application is a continuation-in-part of application Ser. No. 537,308, filed Jun. 13, 1990, now abandoned.

Aliphatic polyol poly(allyl carbonate) monomer, most notably diethylene glycol bis(allyl carbonate), has for many years been used in producing ophthalmic lenses. Such lenses exhibit refractive indices that are sufficient for many, if not most, ophthalmic applications. There is a need, however, for polymeric lenses of higher refractive indices than those ordinarily provided by polymers of aliphatic polyol poly(allyl carbonate). This need centers around the desire to reduce the volume of material required to produce a lens of given size, minimum thickness, and optical correction, which volumetric reduction can be achieved through use of polymeric materials having higher refractive indices. Polymers of various types and descriptions which have such higher refractive indices are indeed known.

High refractive index is not the only criterion, however. The polymer must also possess other physical properties which render it satisfactory for ophthalmic lenses. Among such physical properties are high heat distortion temperature and for most ophthalmic applications, acceptably low yellowness. Some polymers have satisfactorily high refractive indices, but fail to exhibit one or more other satisfactory physical properties.

Most thermoset organic ophthalmic lens blanks and some lenses are produced from polymerizable compositions by casting procedures. It is therefore highly desirable that the polymerizable compositions be pourable at the casting temperature. Satisfying this characteristic imposes an additional constraint on systems for producing high refractive index lenses.

The search for those polymerizable compositions which are castable and capable of producing polymers exhibiting higher than usual refractive indices and other satisfactory physical properties, therefore continues.

High refractive index lenses produced by polymerizing a resin having at least two epoxy groups and/or epithio groups in one molecule with a polythiol is known. See, for example, published application WO89/10575, the disclosure of which is, in its entirety, incorporated by reference. The resulting polymers often have high refractive indices, but the heat distortion temperatures are often low.

Polymers produced by polymerizing resins having at least two epoxy groups with cyclic anhydrides are also known. See, for example U.S. Pat. No. 2,324,483, the entire disclosure of which is incorporated herein by reference. The resulting polymers frequently have satisfactorily high heat distortion temperatures, but the refractive indices are usually low.

Polymerizable compositions have now been found which are capable of producing polymers of high refractive indices, high heat distortion temperatures, and other physical properties satisfactory for ophthalmic purposes.

Accordingly, the invention is an ophthalmic lens or lens blank produced by polymerizing a polymerizable, homogeneous composition comprising: (a) epichalcogen resin having an average epichalcogen functionality of at least about 1.5 wherein each epichalcogen group is independently an epoxy group or an epithio group; (b) aliphatic polythiol having an average thiol functionality of at least about 2; and (c) cyclic anhydride, the polymerizate having a heat distortion temperature of at least about 50° C. and a refractive index at 20° C. and a wavelength of 589.3 nanometers, of at least about 1.56.

As used herein and in the claims, epoxy means epoxyethyl which is also known as oxiranyl; epithio means epithioethyl; epichalcogen groups mean epoxy groups and epithio groups; and epichalcogen resin means a compound containing one or more epichalcogen groups or a mixture of such compounds.

The epichalcogen resin may be aliphatic, but it usually contains one or more aromatic groups. Although the epichalcogen resin may contain epoxy groups, epithio groups, or both epoxy and epithio groups, most frequently all of the epichalcogen groups are epoxy groups in which case the epichalcogen resin is classified as an epoxy resin.

The average epichalcogen functionality is the average number of epichalcogen groups per molecule of epichalcogen resin. The average epichalcogen functionality of the epichalcogen resin is at least about 1.5. Often the average epichalcogen functionality is at least about 2. At least about 2.2 is preferred. In most cases the average epichalcogen functionality is from about 1.5 to about 4. Frequently it is from about 2 to about 3.7. From about 2 to about 2.5 is preferred.

Many epichalcogen resins are known. They are usually, but not always, produced by reacting compounds containing at least two active hydrogens with epihalohydrin such as epichlorohydrin or epibromohydrin, and/or 1-halo-2,3-epithiopropane such as 1-chloro-2,3-epithiopropane or 1-bromo-2,3-epithiopropane. Examples of classes of compounds having active hydrogen groups include compounds having two or more amino groups, the bisphenols, the chlorinated bisphenols, the brominated bisphenols, the polyhydric phenols, the novolak resins, the cresol novolak resins, the aliphatic polyols, compounds having two or more carboxyl groups, and compounds having two or more isocyanate groups. Many specific examples of epichalcogen resins are disclosed in published application WO89/10575 and elsewhere.

The preferred epichalcogen resins are the epoxy resins and of these, the aromatic-containing epoxy resins are especially preferred. Examples of aromatic-containing epoxy resins include the diglycidyl ethers of polyphanol compounds such as bisphenol A, tetrabromobisphenol A, tetrachlorobisphenol A, bisphenol B, bisphenol C, bisphenol E, bisphenol F, bisphenol G, bisphenol M, bisphenol P, bisphenol S, bisphenol Z, bisphenol AP, bisphenol ACP, 4,4'-ethylidenebis[phenol], and hydroxychlor. Other examples of aromatic-containing epoxy resins include the polyglycidyl ethers of catechol, resorcinol, hydroquinone, pyrogallol, phloroglucinol, novolak resin, cresol novolak resin, phthalic acid, isophthalic acid, and terephthalic acid.

The average thiol functionality is the average number of thiol groups per molecule of polythiol. The average thiol functionality of the polythiol is at least about 2. Often the average thiol functionality is at least about 3. At least about 4 is preferred. In most cases the average thiol functionality is from about 2 to about 6. Frequently it is from about 3 to about 6. From about 4 to about 6 is preferred.

The aliphatic polythiols are themselves well known. Many classes and specific examples of polythiols are disclosed in published application WO89/10575 and elsewhere.

The preferred aliphatic polythiols are derivatives of 1,2,3-trimethylolpropane, pentaerythritol, or dipentaerythritol. Examples of these include 1,2,3-trimethylolpropane tri(thioglycolate), 1,2,3-trimethylolpropane tri(3-mercaptopropionate), pentaerythritol tetra(thloglycolate), pentaerythritol tetra(3-mercaptopropionate), dipentaerythritol hexa(thioglycolate), dipentaerythritol hexa(3-mercaptoproptonate), and tetrakis(2-mercaptoethylthiomethyl)methane.

The cyclic anhydrides are those anhydride compounds in which the anhydride group is part of a ring. These compounds are well known to the art. Examples include phthalic anhydride, tetrahydrophthalic anhydride, hexahydrophthalic anhydride, hexahydromethylphthalic anhydride, maleic anhydride adduct of cyclopentadiene, maleic anhydride adduct of methylcyclopentadiene, chlorendic anhydride, and pyromellitic dianhydride. Further examples include the chlorinated and/or brominated derivatives of phthalic anhydride, tetrahydrophthalic anhydride, hexahydrophthalic anhydride, hexahydromethylphthalic anhydride, maleic anhydride adduct of cyclopentadiene, maleic anhydride adduct of methylcyclopentadiene, and pyromellitic dianhydride. Of the cyclic anhydrides, the polycyclic anhydrides are preferred. Such polycyclic anhydrides are two or more rings. The polycyclic anhydrides usually employed have two or three rings. As used herein and in the claims, the equivalency of an anhydride or mixture of anhydrides is based on the anhydride group per se, and not upon the carboxylic acid groups upon opening the ring.

As used herein and in the claims, "aromatic content" means the weight fraction of the material of reference which consists of aromatic ring atoms and any hydrogen atoms directly attached to such atoms, multiplied by 100. Aromatic content is expressed as weight percent.

The aromatic content and the sulfur content of the polymerizable, homogeneous composition may vary widely, but usually the aromatic content is at least about 23 weight percent of the composition and the sulfur content is at least about 1.9 weight percent of the composition. Often the aromatic content is from about 23 to about 36 weight percent and the sulfur content is from about 1.9 to about 12 weight percent. An aromatic content of from about 27 to about 36 weight percent and a sulfur content of from about 6 to about 11 weight percent are preferred.

The ratio of equivalents of epichalcogen groups to the sum of the equivalents of thiol groups and the equivalents of anhydride groups in the polymerizable, homogeneous composition may also vary widely. In most cases the ratio is from about 0.5:1 to about 1.5:1. Frequently the ratio is from about 0.75:1 to about 1.25:1. Preferably the ratio is about 1:1.

The equivalent ratio of thiol groups to anhydride groups in the polymerizable, homogeneous composition is also susceptible to wide variation. Usually the equivalent ratio of thiol groups to anhydride groups in the composition is from about 0.25:1 to about 20:1. Frequently the equivalent ratio is from about 1:1 to about 20:1. From about 3:1 to about 20:1 is preferred.

In addition to the epichalcogen resin, polythiol, and cyclic anhydride, the polymerizable composition may also optionally contain various other materials. Examples of such optional materials include other polymers, polyols, polycarboxylic acids, ethylenically unsaturated aromatic-containing compounds, catalysts, mold release agents, dyes, oxidative stabilizers, and ultraviolet light absorbers. This listing of optional ingredients is by no means exhaustive. These and other ingredients may be employed in their customary amounts for their customary purposes so long as they do not seriously interfere with good polymer formulating practice.

Preferably, the polymerizable, homogeneous composition contains catalyst to increase the rate of polymerization. There are many different types of polymerization catalysts that can be used, but ordinarily tertiary amine or organo tin catalysts are employed. Examples of such catalysts include triethylamine, dibutyl tin dilaurate, stannous octoate, and butyl stannoic acid. The organo tin catalysts are preferred.

When used, the amount of polymerization catalyst present in the polymerizable, homogeneous composition may be widely varied. Ordinarily the polymerization catalyst constitutes from about 50 to about 10000 parts of polymerization catalyst per million parts of polymerizable, homogeneous composition by weight. The amount of polymerization catalyst used in any particular situation will normally depend upon the activity of the particular catalyst under consideration and the pot-life desired.

The polymerizable homogeneous compositions of the invention are usually prepared by admixing the various ingredients. Mixing may be accompanied with heating when it is desirable to hasten dissolution of any of the ingredients. However, the temperature should ordinarily be maintained below that at which substantial polymerization commences.

In most cases the polymerizable homogeneous compositions of the invention are pourable. The term "pourable" as used herein and in the claims means the viscosity of the composition is sufficiently low that it can be poured into molds commonly used in casting ophthalmic lenses and lens blanks. In most cases the temperature of the polymerizable, homogeneous composition when poured into molds is usually in the range of from about 20° C. to about 100° C.

The polymerizable homogeneous compositions of the invention can be polymerized (viz., cured) to form solid crosslinked polymer by the known conventional techniques for polymerizing epoxy-thiol and epoxy-anhydride systems.

Preferably, polymerization is accomplished by heating the polymerizable composition to elevated temperatures. Generally polymerization is conducted at temperatures in the range of from about 50° C. to about 250° C. Preferably polymerization is conducted at temperatures in the range of from about 60° C. to about 150° C.

In most cases the polymerizable homogeneous composition is conformed to the shape of the final solid polymerized article before polymerization. For example, the polymerizable composition is placed in molds, as for instance glass or metal molds, and the molds heated to effect polymerization, thereby forming shaped articles such as lens blanks or ophthalmic lenses.

The present polymerizates have refractive indices, at 20° C. and a wavelength of 589.3 nanometers, of at least about 1.56. Often the refractive index under the same conditions is at least about 1.58. Preferably it is at least about 1.59.

The present polymerizates also have a heat distortion temperature of at least about 50° C. In many cases the heat distortion temperature is at least about 55° C. Preferably the heat distortion temperature is at least about 60° C. As used in the present specification and claims, heat distortion temperature is determined in accordance with ASTM D 648-86 which is, in its entirety, incorporated herein by reference.

In many cases the polymerizates of the present invention, on and undyed and untinted basis, also exhibit one or more favorable properties.

Among these favorable properties may be mentioned an acceptably low yellowness. In most cases the present polymerizates, on an undyed and untinted basis, also have yellowness indices at a sample thickness of about 3.3 millimeters of about 4 or lower. Often the yellowness index is about 3 or lower. Preferably, the yellowness index is about 2 or lower. As used herein and in the claims, yellowness index is determined on specimens having a thickness of about 3.3 millimeters in accordance with ASTM Test Method D 1925-70 (Reapproved 1977) using a Hunterlab Tristimulus Colorimeter Model D25P employing a collimated Illuminant C standard light source.

Other such favorable properties include high luminous transmission and low haze. As used herein and in the claims, luminous transmission and haze value are determined on specimens having a thickness of about 3.3 millimeters in accordance with ASTM Test Method D 1003-61 (Reapproved 1977) using a Hunterlab Tristimulus Colorimeter Model D25P employing a collimated Illuminant C standard light source. As the luminous transmission approaches one hundred percent, the difference in luminous transmissions for two samples of the same material but of differing thicknesses approaches zero. Consequently, values of luminous transmission of about 90 percent or greater ascertained from samples having thicknesses within about a millimeter of the 3.3 millimeter standard, approximate reasonably well the luminous transmission at the standard thickness. In similar fashion, haze values of about one percent or less ascertained on samples having thicknesses within about a millimeter of the 3.3 millimeter standard, approximate reasonably well the haze values at the standard thickness. Although the yellowness index seems to vary more with sample thickness than luminous transmission or haze value, nevertheless yellowness indices ascertained from samples having thicknesses within about a millimeter of the 3.3 millimeter standard do provide a useful general indication of the yellowness index at the standard thickness.

In most cases the luminous transmissions of the present polymerizates, on an undyed and untinted basis, are at least about 80 percent. Frequently the luminous transmission is at least about 85 percent. Preferably the luminous transmission is at least about 88 percent.

Often the haze values of the polymerizates, on an undyed and untinted basis, are about 5 percent or lower. In many cases the haze value is about 4 percent or lower, and preferably it is about 2 percent or lower.

Another favorable property is a 15-second Barcol hardness of at least about 15. In many cases the 15-second Barcol hardness is at least about 20. As used herein, 15-second Barcol hardness is determined in accordance with ASTM D 2583-81 using a Barcol Impressor and taking scale readings 15 seconds after the impressor point has penetrated the specimen. ASTM D 1583-81 is, in its entirety, incorporated herein by reference.

The density of most of the polymerizates of the invention is usually about 1.6 grams per cubic centimeter (g/cm$^3$) or lower. Frequently the density is about 1.35 g/cm$^3$ or lower. Preferably the density is 1.3 g/cm$^3$ or lower. As used in the present specification and claims, density is determined in accordance with ASTM C 729-75 and reported for a temperature of 25° C. ASTM C 729-75 is, in its entirety, incorporated herein by reference.

The invention is further described in conjunction with the following examples which are to be considered illustrative rather than limiting, and in which all parts are parts by weight and all percentages are percentages by weight unless otherwise specified.

GENERAL PROCEDURE FOR EXAMPLES 1-3

Polymerizable, homogeneous compositions were prepared by admixing epoxy resin, polythiol, cyclic anhydride, and dibutyl tin dilaurate at temperatures in the range of from 50° C. to 120° C. to facilitate mixing and pouring into molds. Each polymerizable, homogeneous composition comprised 5000 parts of dibutyl tin dilaurate per million parts of polymerizable, homogeneous composition, by weight. Glass ophthalmic lens blank molds were surface-treated with Rain-X ® silicone release agent (Unelko Corp.). The polymerizable, homogeneous compositions were poured into the surface-treated molds and the filled molds were placed in a hot air oven and exposed to the cure cycle shown in Table 1. When the cure cycle was completed, the molds were removed from the oven and allowed to cool. The resulting polymerizates were then removed from the molds and tested for various physical properties. Abbreviations for materials are shown in Table 2. The identities and amounts of epoxy resin, polythiol, and cyclic anhydride constituting the polymerizable, homogeneous compositions and the results of testing the resulting polymerizates are shown in Examples 1-3.

TABLE 1

| Cure Cycle | |
|---|---|
| Cumulative Hours | Oven Temperature, °C. |
| 0 | 90 |
| 10 | 95 |
| 14 | 102 |
| 16 | 110 |
| 16.5 | 120 |
| 17 | 130 |
| 18 | 140 |
| 20 | 150 (End of Cycle.) |

TABLE 2

| Abbreviations | |
|---|---|
| Abbreviation | Material |
| BPADGE | Bisphenol A diglycidyl ether |
| BPFDGE | Bisphenol F diglycidyl ether |
| ENR | DEN ™ 431 epoxy novolac resin (Dow Chemical Co.) |
| PTMP | Pentaerythritol tetramercaptopropionate |
| NMA | Maleic anhydride adduct of methylcyclopentadiene |
| MHHPA | Methyl hexahydrophthalic anhydride |
| HHPA | Hexahydrophthalic anhydride |
| PA | Phthalic anhydride |

TABLE 3

| Formulations | | | |
|---|---|---|---|
| Formulation Number | Materials | Weight, grams | Equivalent Ratio |
| 1 | BPADGE/PTMP | 17.0/12.2 | 1/1 |
| 2 | BPADGE/PTMP/NMA | 17.0/9.8/3.6 | 1/0.8/0.2 |
| 3 | BPADGE/PTMP/MHHPA | 17.0/9.8/3.4 | 1/0.8/0.2 |
| 4 | BPADGE/PTMP/HHPA | 17.0/9.8/3.1 | 1/0.8/0.2 |

TABLE 3-continued

Formulations

| Formulation Number | Materials | Weight, grams | Equivalent Ratio |
|---|---|---|---|
| 5 | BPADGE/PTMP/PA | 17.0/9.8/3.0 | 1/0.8/0.2 |
| 6 | BPADGE/PTMP/NMA | 17.0/6.1/8.9 | 1/0.5/0.5 |
| 7 | BPADGE/PTMP/MHHPA | 17.0/6.1/8.4 | 1/0.5/0.5 |
| 8 | BPADGE/PTMP/HHPA | 17.0/6.1/7.7 | 1/0.5/0.5 |

TABLE 4

Physical Properties of Polymerizates

| Formulation Number | Refractive Index | Abbe Number | Barcol Hardness, 15-second | Heat Distortion Temperature, °C. |
|---|---|---|---|---|
| 1 | 1.5886 | 35.4 | 8 | 38 |
| 2 | 1.5815 | 35.4 | 24 | 60 |
| 3 | 1.5779 | 37.4 | 18 | 51 |
| 4 | 1.5803 | 35.8 | 12 | 54 |
| 5 | 1.5863 | 34.3 | 20 | 53 |
| 6 | 1.5718 | 37.2 | 37 | 82 |
| 7 | 1.5631 | 38.3 | 31 | 74 |
| 8 | 1.5691 | 37 | 23 | 70 |

TABLE 5

Formulations

| Formulation Number | Materials | Weight, grams | Equivalent Ratio |
|---|---|---|---|
| 9 | BPFDGE/PTMP | 16.5/12.2 | 1/1 |
| 10 | BPFDGE/PTMP/NMA | 16.5/9.8/3.6 | 1/0.8/0.2 |
| 11 | BPFDGE/PTMP/MHHPA | 16.5/9.8/3.4 | 1/0.8/0.2 |
| 12 | BPFDGE/PTMP/HHPA | 16.5/9.8/3.1 | 1/0.8/0.2 |
| 13 | BPFDGE/PTMP/PA | 16.5/9.8/3.0 | 1/0.8/0.2 |
| 14 | BPFDGE/PTMP/NMA | 16.5/6.1/8.9 | 1/0.5/0.5 |
| 15 | BPFDGE/PTMP/MHHPA | 16.5/6.1/8.4 | 1/0.5/0.5 |
| 16 | BPFDGE/PTMP/HHPA | 16.5/6.1/7.7 | 1/0.5/0.5 |

TABLE 6

Physical Properties of Polymerizates

| Formulation Number | Refractive Index | Abbe Number | Barcol Hardness, 15-second | Heat Distortion Temperature, °C. |
|---|---|---|---|---|
| 9 | 1.5957 | 33.4 | 11 | 40 |
| 10 | 1.5881 | 35.4 | 20 | 55 |
| 11 | 1.5844 | 39.1 | 20 | 54 |
| 12 | 1.5866 | 35.4 | 19 | 43 |
| 13 | 1.5968 | 33.4 | 22 | 51 |
| 14 | 1.5774 | 36.5 | 36 | 72 |
| 15 | 1.5691 | 36.5 | 30 | 68 |
| 16 | 1.5749 | 36.5 | 30 | 65 |

TABLE 7

Formulations

| Formulation Number | Materials | Weight, grams | Equivalent Ratio |
|---|---|---|---|
| 17 | ENR/PTMP | 17.5/12.2 | 1/1 |
| 18 | ENR/PTMP/NMA | 17.5/9.8/3.6 | 1/0.8/0.2 |
| 19 | ENR/PTMP/MHHPA | 17.5/9.8/3.4 | 1/0.8/0.2 |
| 20 | ENR/PTMP/HHPA | 17.5/9.8/3.1 | 1/0.8/0.2 |
| 21 | ENR/PTMP/PA | 17.5/9.8/3.0 | 1/0.8/0.2 |
| 22 | ENR/PTMP/PA | 17.5/8.5/4.4 | 1/0.7/0.3 |
| 23 | ENR/PTMP/NMA | 17.5/6.1/8.9 | 1/0.5/0.5 |
| 24 | ENR/PTMP/MHHPA | 17.5/6.1/8.4 | 1/0.5/0.5 |
| 25 | ENR/PTMP/HHPA | 17.5/6.1/7.7 | 1/0.5/0.5 |

TABLE 8

Physical Properties of Polymerizates

| Formulation Number | Refractive Index | Abbe Number | Barcol Hardness, 15-second | Heat Distortion Temperature, °C. |
|---|---|---|---|---|
| 17 | 1.5987 | 34.5 | 15 | 43 |
| 18 | 1.5911 | 34.4 | 28 | 61 |
| 19 | 1.5874 | 35.6 | 26 | 59 |
| 20 | 1.5906 | 35.4 | 24 | 59 |
| 21 | 1.6002 | 33 | 28 | 56 |
| 22 | 1.6001 | 32.5 | 29 | 65 |
| 23 | 1.5806 | 35.3 | 39 | 86 |
| 24 | 1.5721 | 36.5 | 36 | 77 |
| 25 | 1.5785 | 35.4 | 38 | 76 |

EXAMPLE 4

An additive composition was prepared by admixing triphenyl phosphite [CAS 101-02-0], 0.31 milligram of 1-[(2,6-dibromo-4-methylphenyl)amino]-4-hydroxy-9,10-anthracenedione [CAS 68239-61-2] per gram of triphenyl phosphite, and 0.155 milligram of 1-hydroxy-4-[(4-methylphenyl)amino]-9,10-anthracenedione [CAS 81-48-1] per gram of triphenyl phosphite.

A polymerizable, homogeneous composition was prepared by admixing the following materials at between 50° C. and 80° C. until a homogeneous solution is obtained: 8.75 grams of DEN ™ 431 epoxy novolac resin (Dow Chemical Co.), 8.9 grams of DEN ™ 438 epoxy novolac resin (Dow Chemical Co.), 7.93 grams of pentaerythritol tetramercaptopropionate, 3.56 grams of the maleic anhydride adduct of methylcyclopentadiene, 2.22 grams of phthalic anhydride, 0.31 gram of 2-hydroxy-4-(octyloxy)benzophenone [CAS 1843-0-5-6], 0.47 gram 3,5-bis(1,1-dimethylethyl)-4-hydroxybenzenepropanoic acid, thiodi-2,1-ethanediyl ester [CAS 41484-35-9], 0.16 gram of the above additive composition, and 0.022 gram of Golden Forest fragrance (International Flavors and Fragrances Inc.). The polymerizable, homogeneous composition was poured into a plano glass mold which had been surface treated with CR-400 ™ release agent (Nanofilm Corp.). The filled mold was placed in a hot air oven and exposed to the cure cycle shown in Table 9.

TABLE 9

Cure Cycle

| Cumulative Hours | Oven Temperature, °C. |
|---|---|
| 0 | 50 |
| 16 | 50 |
| 32 | 130 |
| 40 | 130 |
| 42 | 90 (End of Cycle.) |

When the cure cycle was completed, the mold was removed from the oven and allowed to cool. The resulting polymerizate was then removed from the mold and tested for various physical properties. The results of testing the polymerizate is shown in Table 10.

TABLE 10

Physical Properties of Polymerizate

| | |
|---|---|
| Refractive Index | 1.593 |
| Abbe Number | 34 |
| 15-Second Barcol Hardness | 38 |
| Heat Distortion Temperature | 75° C. |
| Luminous Transmission | 89.20% |
| Yellowness Index | 1.48 |
| Density | 1.289 g/cm$^3$ |

TABLE 10-continued

| Physical Properties of Polymerizate | |
|---|---|
| Haze Value | 0.22% |

EXAMPLE 5

The procedure of Example 4 was repeated except that the quantities of materials were increased by a factor of 100 and the polymerizable, homogeneous composition was poured into glass ophthalmic lens blank molds which had been surface treated as in Example 4. After curing and cooling, the resulting lens blanks were removed from the molds. The lens blanks were suitable for edging to form ophthalmic lenses.

EXAMPLE 6

A polymerizable, homogeneous composition was prepared by admixing the following materials at between 50° C. and 80° C. until a homogeneous solution is obtained: 17.4 grams of DER TM 332 epoxy resin (Dow Chemical Co.), 5.49 grams of pentaerythritol tetramercaptopropionate, 5.60 grams of the maleic anhydride adduct of methylcyclopentadiene, 3.49 grams of phthalic anhydride, 0.16 gram dibutyltin dilaurate, 0.16 gram of 2-hydroxy-4-(octyloxy)benzophenone [CAS 1843-05-6], 0.16 gram 3,5-bis(1,1-dimethylethyl)-4-hydroxybenzenepropanoic acid, thiodi-2,1-ethanediyl ester [CAS 41484-35-9], 0.32 gram of decanedioic acid, bis(1,2,2,6,6-pentamethyl-4-piperidinyl) ester [CAS 41556-26-7], 0.112 gram of the additive composition of Example 4, and 0.022 gram of Golden Forest fragrance (International Flavors and Fragrances Inc.). The polymerizable, homogeneous composition was poured into a plano glass mold which had been surface treated with CR-400 TM release agent (Nanofilm Corp.). The filled mold was placed in a hot air oven and exposed to the cure cycle shown in Table 9. When the cure cycle was completed, the mold was removed from the oven and allowed to cool. The resulting polymerizate was then removed from the mold and tested for various physical properties. The results of testing the polymerizate is shown in Table 11.

TABLE 11

| Physical Properties of Polymerizate | |
|---|---|
| Refractive Index | 1.580 |
| Abbe Number | 34 |
| 15-Second Barcol Hardness | 38 |
| Heat Distortion Temperature | 81° C. |
| Luminous Transmission | 90.20% |
| Yellowness Index | 1.24 |
| Density | 1.253 g/cm$^3$ |
| Haze Value | 0.62% |

EXAMPLE 7

The procedure of Example 6 was repeated except that the quantities of materials were increased by a factor of 100 and the polymerizable, homogeneous composition was poured into glass ophthalmic lens blank molds which had been surface treated as in Example 6. After curing and cooling, the resulting lens blanks were removed from the molds. The lens blanks were suitable for edging to form ophthalmic lenses. Although the present invention has been described with reference to specific details of certain embodiments thereof, it is not intended that such details should be regarded as limitations upon the scope of the invention except insofar as they are included in the accompanying claims.

We claim:

1. An ophthalmic lens or lens blank produced by polymerizing a polymerizable, homogeneous composition comprising:
   (a) epichalcogen resin having an average epichalcogin functionality of at least about 1.5 wherein each epichalcogen group is independently an epoxy group or an epithio group;
   (b) aliphatic polythiol having an average thiol functionality of at least about 2; and
   (c) cyclic anhydride,
wherein:
   (d) said polymerizable, homogeneous composition is characterized by an aromatic content of at least about 23 weight percent, and a sulfur content of at least about 1.9 weight percent; and
   (e) said lens or lens blank has a heat distortion temperature of at least about 50° C. and a refractive index, at 20° C. and a wavelength of 589.3 nanometers, of at least about 1.56.

2. The ophthalmic lens or lens blank of claim 1 which is characterized by:
   (a) a luminous transmission of at least about 80 percent, and
   (b) a yellowness index of about 4 or lower.

3. The ophthalmic lens or lens blank of claim 1 which is characterized by:
   (a) a luminous transmission of at least about 88 percent, and
   (b) a yellowness index of about 2 or lower.

4. An ophthalmic lens or lens blank produced by polymerizing a polymerizable, homogeneous composition comprising:
   (a) epoxy resin having an average epoxy functionality of at least about 1.5;
   (b) aliphatic polythiol having an average thiol functionality of at least about 2; and
   (c) cyclic anhydride,
wherein:
   (d) said polymerizable homogeneous composition is characterized by an aromatic content of at least about 23 weight percent, and a sulfur content of at least about 1.9 weight percent; and
   (e) said lens or lens blank has a heat distortion temperature of at least about 50° C. and a refractive index, at 20° C. and a wavelength of 589.3 nanometers, of at least about 1.56.

5. The ophthalmic lens or lens blank of claim 4 which is characterized by:
   (a) a heat distortion temperature of at least about 55° C., and
   (b) a refractive index at 20° C. and a wavelength of 589.3 nanometers of at least about 1.58.

6. The ophthalmic lens or lens blank of claim 4 which is characterized by:
   (a) a heat distortion temperature of at least about 60° C., and
   (b) a refractive index at 20° C. and a wavelength of 589.3 nanometers of at least about 1.58.

7. The ophthalmic lens or lens blank of claim 4 wherein said cyclic anhydride is polycyclic anhydride.

8. The ophthalmic lens or lens blank of claim 7 which is characterized by:
   (a) a luminous transmission of at least about 80 percent, and
   (b) a yellowness index of about 4 or lower.

9. The ophthalmic lens or lens blank of claim 7 which is characterized by:
(a) a luminous transmission of at least about 85 percent, and
(b) a yellowness index of about 3 or lower.

10. The ophthalmic lens or lens blank of claim 7 which is characterized by:
(a) a luminous transmission of at least about 88 percent, and
(b) a yellowness index of about 2 or lower.

11. The ophthalmic lens or lens blank of claim 7 which is characterized by a density of about 1.3 grams per cubic centimeter or lower.

12. The ophthalmic lens or lens blank of claim 11 which is characterized by a haze value of about 2 percent or lower.

13. The ophthalmic lens or lens blank of claim 12 wherein the ratio of equivalents of epoxy groups to the sum of the equivalents of thiol groups and the equivalents of anhydride groups in said polymerizable, homogeneous composition is about 1:1.

14. An ophthalmic lens or lens blank produced by polymerizing a polymerizable, homogeneous composition comprising:
(a) epoxy resin having an average epoxy functionality of at least about 1.5;
(b) aliphatic polythiol having an average thiol functionality of at least about 2; and
(c) cyclic anhydride selected from the group consisting of phthalic anhydride, tetrahydrophthalic anhydride, hexahydrophthalic anhydride, hexahydromethylphthalic anhydride, maleic anhydride adduct of cyclopentadiene, maleic anhydride adduct of methylcyclopentadiene, chlorendic anhydride, pyromellitic dianhydride, chlorinated derivative of phthalic anhydride, chlorinated derivative of tetrahydrophthalic anhydride, chlorinated derivative of hexahydrophthalic anhydride, chlorinated derivative of hexahydromethylphthalic anhydride, chlorinated derivative of maleic anhydride adduct of cyclopentadiene, chlorinated derivative of maleic anhydride adduct of methylcyclopentadiene, chlorinated derivative of pyromellitic dianhydride, brominated derivative of phthalic anhydride, brominated derivative of tetrahydrophthalic anhydride, brominated derivative of hexahydrophthalic anhydride, brominated derivative of hexahydromethylphthalic anhydride, brominated derivative of maleic anhydride adduct of cyclopentadiene, brominated derivative of maleic anhydride adduct of methylcyclopentadiene, brominated derivative of pyromellitic dianhydride, chlorinated and brominated derivative of phthalic anhydride, chlorinated and brominated derivative of tetrahydrophthalic anhydride, chlorinated and brominated derivative of hexahydrophthalic anhydride, chlorinated and brominated derivative of hexahydromethylphthalic anhydride, chlorinated and brominated derivative of maleic anhydride adduct of cyclopentadiene, chlorinated and brominated derivative of maleic anhydride adduct of methylcyclopentadiene, and chlorinated and brominated derivative of pyromellitic dianhydride;
wherein:
(d) said polymerizable, homogeneous composition is characterized by an aromatic content of at least about 23 weight percent, and a sulfur content of at least about 1.9 weight percent; and
(e) said lens or lens blank has a heat distortion temperature of at least about 50° C. and a refractive index, at 20° C. and a wavelength of 589.3 nanometers, of at least about 1.56.

15. The ophthalmic lens or lens blank of claim 14 which is characterized by:
(a) a luminous transmission of at least about 80 percent;
(b) a yellowness index of about 4 or lower;
(c) a haze value of about 5 percent or lower;
(d) a density of about 1.6 grams per cubic centimeter or lower; and
(g) a 15-second Barcol hardness of at least about 15.

16. The ophthalmic lens or lens blank of claim 14 which is characterized by:
(a) a heat distortion temperature of at least about 55° C.;
(b) a refractive index at 20° C. and a wavelength of 589.3 nanometers of at least about 1.58;
(c) a luminous transmission of at least about 85 percent;
(d) a yellowness index of about 3 or lower;
(e) a haze value of about 4 percent or lower;
(f) a density of about 1.35 grams per cubic centimeter or lower; and
(g) a 15-second Barcol hardness of at least about 15.

17. The ophthalmic lens or lens blank of claim 14 which is characterized by:
(a) a heat distortion temperature of at least about 60° C.;
(b) a refractive index at 20° C. and a wavelength of 589.3 nanometers of at least about 1.59;
(c) a luminous transmission of at least about 88 percent;
(d) a yellowness index of about 2 or lower;
(e) a haze value of about 2 percent or lower;
(f) a density of about 1.3 grams per cubic centimeter or lower; and
(g) a 15-second Barcol hardness of at least about 20.

* * * * *